United States Patent [19]

Kinas

[11] Patent Number: 4,551,046
[45] Date of Patent: Nov. 5, 1985

[54] DEVICE FOR REPRODUCING CODED KEYS

[75] Inventor: Henry Kinas, Neuilly S/Seine, France

[73] Assignee: Societe Anonyme H.K. France, Paris, France

[21] Appl. No.: 521,553

[22] Filed: Aug. 9, 1983

[30] Foreign Application Priority Data

Aug. 12, 1982 [FR] France ................... 82 14243

[51] Int. Cl.[4] .................................................. B23C 1/16
[52] U.S. Cl. ........................................... 409/82; 76/110
[58] Field of Search ............................ 409/81, 82, 83; 51/100 R; 76/110

[56] References Cited

U.S. PATENT DOCUMENTS

| 4,188,163 | 2/1980 | Juskevic | 409/82 |
| 4,251,173 | 2/1981 | Saucedo | 409/82 |
| 4,256,423 | 3/1981 | Juskevic | 409/82 |

FOREIGN PATENT DOCUMENTS 1209847  1/1966  Fed. Rep. of Germany ........ 409/82

*Primary Examiner*—William R. Briggs
*Attorney, Agent, or Firm*—Young & Thompson

[57] ABSTRACT

The invention relates to a device for reproducing coded keys adapted to machines for reproducing keys by scanning and comprising a rotary cutter and a follower adapted to be displaced simultaneously in two orthogonal directions, wherein said device comprises a support, a first carriage mounted to move with respect to the support, a second carriage mobile with respect to the first and bearing a bar provided with a single notch whose shape is that of the notches of the key to be reproduced, the two carriages being mobile respectively in the longitudinal direction of the bar and in the direction of the depth of the notch thereof, means for immobilizing one of the carriages in one of several marked positions each corresponding to one of the possible locations for the notches of the key to be reproduced, and means for immobilizing the other carriage in one of several marked positions each corresponding to one of the possible depths for these notches.

2 Claims, 5 Drawing Figures

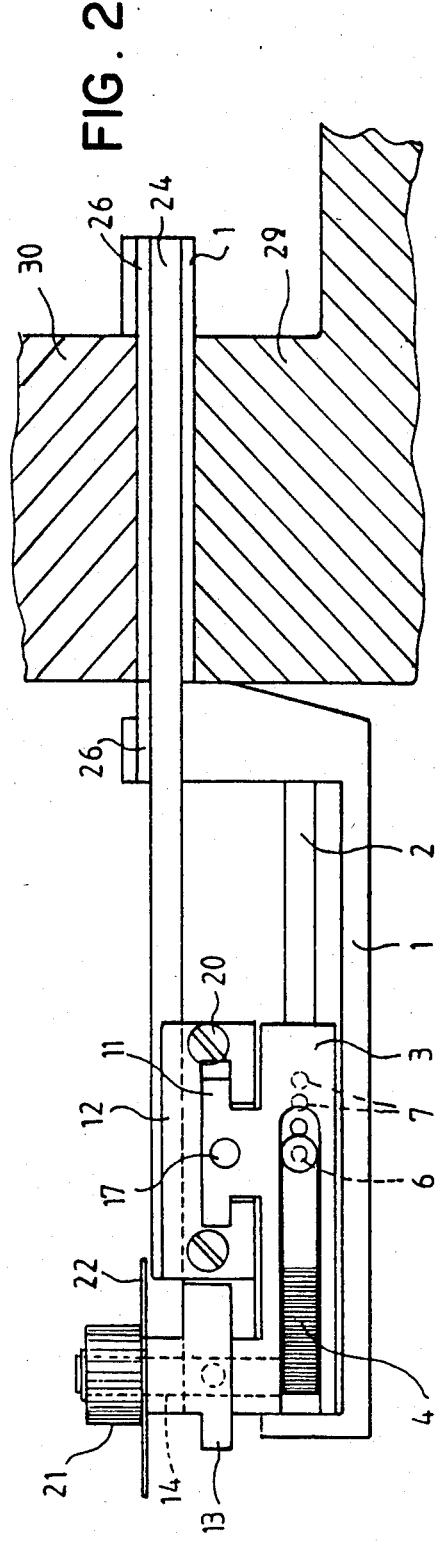
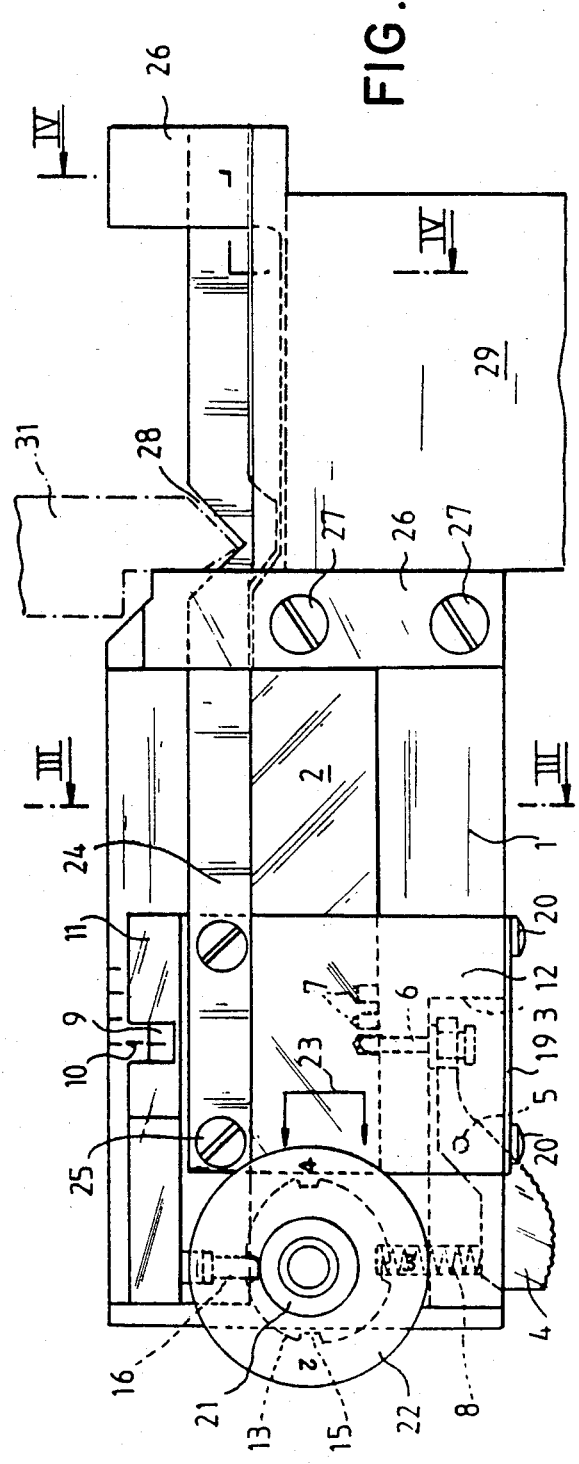
FIG. 1
FIG. 2

FIG. 3
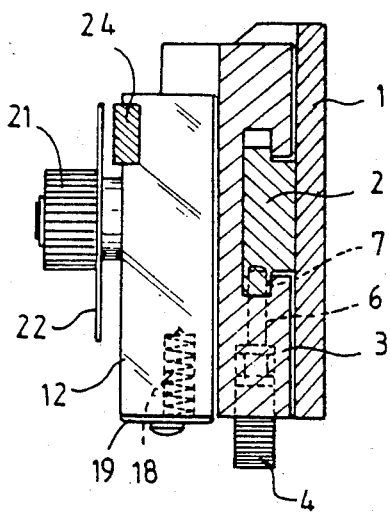
FIG. 4
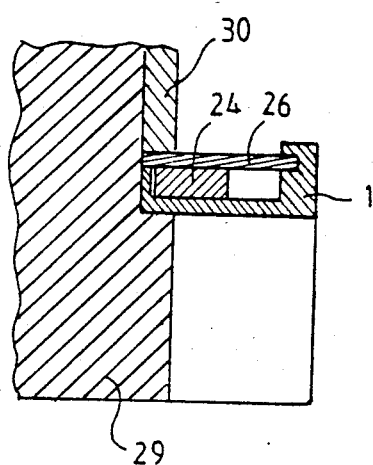
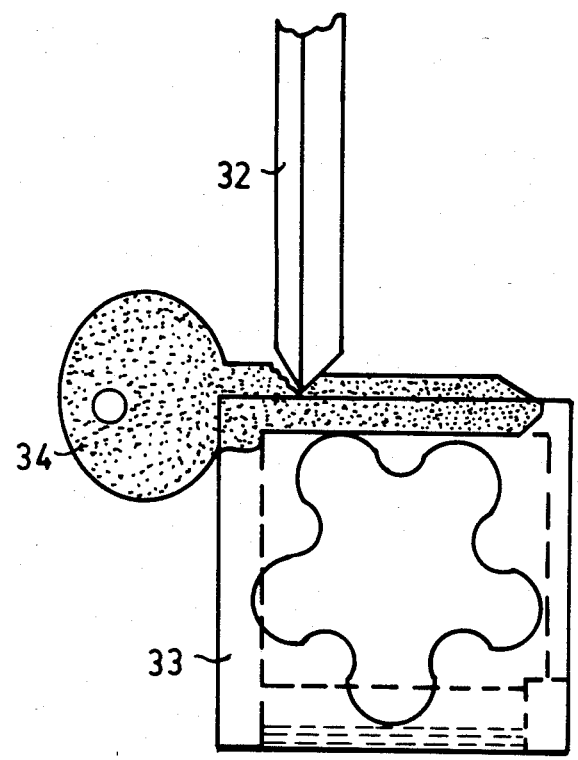
FIG. 5

DEVICE FOR REPRODUCING CODED KEYS

FIELD OF THE INVENTION

The present invention relates to a device for reproducing coded keys.

BACKGROUND OF THE INVENTION

Machines for reproducing flat keys exist which comprise a rotary cutter and a follower, these two elements being adapted to be displaced simultaneously in two orthogonal directions. These machines are often used to reproduce a key of which a model is available and which is fixed in front of the follower. In this case, the follower scans the notches of the model key; the cutter then cuts notches which are identical to those of the model key, into a blank fixed in front of it.

These machines may also be used for reproducing a key of which only the code number is known. In this case, up to the present time, mother-keys or matrices are used, which comprise notches spaced apart from one another by a distance equal to the spacing between the notches of the key to be produced, all these notches having the same depth in a given matrix; one matrix exists for each figure of the code, i.e. for each possible depth for a notch. A matrix corresponding to the first figure of the code is fixed in front of the follower and the follower is engaged in the first notch of this matrix so as to cut the first notch in the blank. This matrix is then replaced by a second matrix corresponding to the second figure of the code and the follower is engaged in the second notch of this matrix so as to cut a second notch in the blank. This operation is continued successively for all the figures of the code.

However, this method is not satisfactory. After each notch has been cut, a matrix must be repositioned, which is complicated and a source of error. Furthermore, a determined notch of the matrix, and only this notch, mut be scanned by the follower. This operation is delicate; if the follower slips, the cutter forms a notch of incorrect shape and the blank being cut must be scrapped. This latter drawback may be overcome by providing one matrix per depth and per possible location of notch, but, in that case, the number of matrices is considerably increased; there is always a source of errors due to the repositioning of a matrix after each notch is cut.

Machines also exist in which a blank is cut notch by notch with the aid of a cutter having the shape of the notch, by displacing the blank clamped in a vice longitudinally and transversely in front of the cutter. However, if the type of key is changed, the cutter must be changed, which is a difficult and delicate operation. Moreover, the operator must calculate the displacements of the vice as a function of the code of the key, which is a source of errors.

BRIEF SUMMARY OF THE INVENTION

It is an object of the present invention to provide a device adapted to machines for reproducing keys by scanning, of the type mentioned above, and which makes it possible to reproduce a key of which the code number is known, avoiding the drawbacks set forth hereinabove.

This device is characterized in that it comprises a support, a first carriage mounted to move with respect to the support, a second carriage mobile with respect to the first and bearing a bar provided with a single notch whose shape is that of the notches of the key to be reproduced, the two carriages being mobile respectively in the longitudinal direction of the bar and in the direction of the depth of the notch thereof, means for immobilising one of the carriages in one of several marked positions each corresponding to one of the possible locations for the notches of the key to be reproduced, and means for immobilising the other carriage in one of several marked positions each corrsponding to one of the possible depths for these noches.

It then suffices to fix the device in the reproducing machine, in place of the model key, opposite the follower of the machine, so that the directions of displacement of the carriages are parallel to the directions of displacement of the cutter and of the follower, and to bring in front of this follower the notch of the bar placed successively in the different locations of the notches of the key to be made, by disposing it each time at a depth corresponding to the figure of the code relative to this location.

BRIEF DESCRIPTION OF THE DRAWINGS

The invention will be more readily understood on reading the following description with reference to the accompanying drawings, in which:

FIG. 1 is a plan view of the device;

FIG. 2 is a view in elevation;

FIG. 3 is a section thereof along III—III of FIG. 1;

FIG. 4 is a section thereof along IV—IV of FIG. 1; and

FIG. 5 is a view in elevation of the key blank holding and cutting assembly.

PARTICULAR DESCRIPTION OF THE DRAWINGS

Referring now to the drawings, the device according to the invention comprises a support 1 on which a longitudinal guide 2 is fixed. A carriage 3 is mounted to slide on this guide. A lever 4 is mounted to pivot at 5 with respect to the carriage 3 and its end, in the form of a fork joint, maintains a rod 6 of which the free end, guided in the carriage, may engage in one of a series of holes 7 provided in the guide 2 and thus immobilize the carriage with respect to the support 1. A spring 8 interposed between the lever and the carriage 3 tends to cause this lever to pivot in the direction corresponding to the engagement of the rod 6 in one of the holes 7. A notch 9 made in the carriage and mobile in front of a series of graduations 10 makes it possible to mark the hole 7 in which the rod 6 is engaged, therefore the longitudinal position of the carriage.

The carriage 3 is fast with a transverse guide 11 on which a second carriage 12 is mounted to slide. An adjusting cam 13 is fixed on a shaft 14 mounted to pivot in the carriage 3. On its periphery, this cam comprises notches 15 in which the end of a finger 16 fixed to the rear part of the carriage 12 and oriented transversely, may engage. The guide 11 presents a bore 17 in which is engaged a spring 18 maintained by a plate 19 which is fixed by bolts 20 on the front face of the carriage 12. This spring thus tends to displace this carriage 12 forwardly and to apply the end of the finger 16 on the cam 13. The shaft 14 bears at its upper end a maneuvering knob 21 beneath which an indicator dial 22 is disposed; this dial bears figures "1", "2", "3", etc. each corresponding to one of the notches 15 of the cam 13 and is mobile in front of an index 23 provided on the carriage 12. When the knob 21 is pivoted so as to bring one of the figures of the dial in front of the index 23, the carriage 12 moves transversely against the action of the spring 18.

A longitudinal bar 24 is fixed by screws 25 on the carriage 12 and is maintained on the support 1 by a counter-plate 26 which is fixed on this support by screws 27 and beneath which the bar may move both longitudinally and transversely. This bar projects with respect to the carriage 12 and its projecting part comprises, on its rear edge, a notch 28 whose shape is identical to that of the notches of the key to be cut.

The assembly which has just been described is intended to be fixed in a vice 29-30 of a key reproducing machine comprising a follower 31 and a scanning cutter 32 mobile in front of a second vice 33 in which a key blank 34 may be fixed (FIG. 5).

This assembly corresponds to a determined type of key. The different holes 7 are spaced apart from one another by a distance equal to that of the notches of the keys of this type. The cam 13 is sectioned so that its notches 15 correspond to the various depths of the notches of the key.

Under these conditions, to make a key comprising for example three notches and having for code X Y Z, a blank is fixed in the machine opposite the cutter, the carriage 3 is brought into the position in which figure "1" appears in the notch 9 of this carriage and the graduation "X" of the dial 22 is brought in front of index 23. The assembly formed by the cutter and the follower 31 is then displaced so that the latter scans the section of the notch 28 of the bar 24; the cutter thus cuts the first notch of the key in the blank. The carriage 3 is then displaced so that the figure "2" appears in the notch 9 and graduation "Y" of the dial 22 is brought in front of index 23. By scanning the notch 28 by the follower, the second notch of the key is cut in the blank. Finally, the carriage 3 is displaced so that the "3" appears in notch 9, the index 23 is brought in front of graduation "Z" of the dial, and the third notch of the key is cut.

The same device may be used for cutting keys of the same type. If keys of another type are to be cut, the assembly is replaced by a similar assembly in which the shape of the notch 28, the spacedapart relationship of the holes 7, the depth of the notches 15 of the cam 13 and the number of these latter notches are adapted as indicated previously to the new type of key to be reproduced.

It goes without saying that the present invention is not to be considered as being limited to the embodiment described and shown, but that it covers, on the contrary, all the variants thereof. For example, a universal device without indexing may be produced, the position of each of the carriages being determined by a sensor associated with an electronic control device.

What is claimed is:

1. Device for reproducing coded keys adapted to machines for reproducing keys by scanning and comprising a rotary cutter and a follower adapted to be displaced simultaneously in two orthogonal directions, wherein said device comprises a support, a first carriage mounted to move with respect to the support, a second carriage mobile with respect to the first and bearing a bar provided with a single notch whose shape is that of the notches of the key to be reproduced, the two carriages being mobile respectively in the longitudinal direction of the bar and in the direction of the depth of the notch thereof, means for immobilising one of the carriages in one of several marked positions each corresponding to one of the possible locations for the notches of the key to be reproduced, and means for immobilising the other carriage in one of several marked positions each corresponding to one of the possible depths for these notches.

2. The device of claim 1, wherein the means for immobilising one of the carriages comprises an adjusting cam which is mounted to pivot with respect to the support or to the other carriage and on which a finger fast with the first carriage is elastically pressed.

* * * * *